UNITED STATES PATENT OFFICE.

CHARLES HALFORD THOMPSON, OF TEIGNMOUTH, ENGLAND.

FERTILIZER AND METHOD OF MAKING SAME.

SPECIFICATION forming part of Letters Patent No. 619,633, dated February 14, 1899.

Application filed June 5, 1897. Serial No. 639,605. (No specimens.)

*To all whom it may concern:*

Be it known that I, CHARLES HALFORD THOMPSON, F. R. H. S., colonel in Her Majesty's Regiment of Royal Artillery, a subject of the Queen of Great Britain, residing at Teignmouth, England, have invented certain new and useful Improvements in the Manufacture of Fertilized and Fertilizing Materials for Promoting the Growth of Plants, of which the following is a specification.

The chief object of my invention is to provide an improved fertilized spongy or fibrous material of the kind described in the specification of former Letters Patent granted to me and dated November 26, 1895, No. 550,545, which material will serve as a substitute for earth, and in which plants may be grown without earth, and in which every species of plant can be raised from seed or struck as cuttings and brought to maturity quicker than in earth.

A further object of my said invention is to provide an improved liquid fertilizer of the kind described in my said former specification in a concentrated form for use after being diluted with every description of plant or agricultural crop, such liquid fertilizer being made from the same chemicals as are used for impregnating the spongy or fibrous material, as hereinafter described.

My improved fertilized material, hereinafter described, may be used as a substitute for earth for sowing seeds, striking cuttings, and raising plants, and other purposes or as "mulching" or manure and is well adapted for use in tea, coffee, and other plantations for bringing on supplies to take the place of those plants that from one cause or another die off annually. Cinchona, orange, mango, sugar-cane, and many other trees and plants have been found to root more freely and retain more moisture around the roots and to come to maturity much sooner when planted in my improved fertilized fiber than when planted in ordinary earth. The material is also specially adapted for rooting vine-cuttings, making vine-borders, and for digging in with every description of fruit-tree when planting the same out.

In manufacturing fertilized fiber according to my present invention I take peat-moss, ordinary moss, sponge clippings, cocoanut fiber, sugar-cane refuse, sawdust, or any other suitable absorbent fibrous or spongy material and impregnate the same with a solution of soot-gypsum, bone-meal, phosphoric acid, potash, (pearlash,) and nitrate of soda in water in the manner and in or about in the proportions hereinafter stated. I usually proceed as follows: I put into a suitable boiler about sixty gallons of water, in which are dissolved four ounces phosphoric acid, four ounces potash, (pearlash,) and four ounces nitrate of soda. In any suitable vessel or holder I put seven pounds chimney-soot, eight pounds raw gypsum, and ten pounds bone-meal, (pulverized bones.) The last three ingredients are made into a paste with the addition of a little water and thoroughly mixed till the consistency of mortar is obtained. The vessel or holder containing the mixture of soot, gypsum, and bone-meal is then lowered into the boiler, which is then filled with the moss or other substance to be impregnated. The water is raised to boiling-point and allowed to boil for from twenty to thirty minutes, being well stirred with a rod to insure the whole mass being acted upon. After stirring a cover is put on with sufficient space around the edges to allow part of the steam to escape, but to confine the remainder thereof. When sufficiently boiled, the fiber is removed from the boiler and put into a suitable press or hydroextractor, and the unabsorbed solution is thereby squeezed into a catch-pit below. This liquor is collected and returned to the boiler, and sufficient water is then added to make up the sixty gallons, and more moss is placed in the boiler and treated in the manner above described. This is done a third time, and the impregnated fiber resulting from the three brewings is mixed together and put into a "fermenting-pit," where it is allowed to ferment, the temperature being carefully taken periodically with a "Bottom" heat-thermometer. If the temperature exceeds 130° Fahrenheit, the fiber is removed and spread out and allowed to cool and is then put back again. I also occasionally increase the temperature by adding yeast or some other ferment if the fermentation does not proceed rapidly enough without it, and I add a small quantity of sugar or saccharine matter in order to give the yeast or other ferment something to feed upon, and thus expedite the fermentation.

In lieu of the above process I sometimes boil the moss or other fibrous material in a liquor prepared in the same proportions from the ingredients above mentioned, thus obviating the necessity for employing a separate vessel or holder.

The nitrate of soda is an important ingredient in the above-described composition, as it not only quickens the action of the fertilized fiber, but reduces the quantity of soot required, thus diminishing the liability of the fertilized fiber being too strong for seedlings. The potash is also an important ingredient in the said composition, as, although it exists in the peat-moss and in the soot, it is not present therein in sufficient quantities to afford the plants the nourishment they require, and potash in proper quantity is absolutely essential to plant life.

My improved fermented liquid fertilizer also consists of soot, raw gypsum, bone-meal, phosphoric acid, potash, (pearlash,) and nitrate of soda, and is prepared by making a solution of these ingredients in water in or about in the following proportions, viz: soot, sixteen pounds; raw gypsum, eighteen pounds; bone-meal, nineteen pounds; phosphoric acid, five ounces; potash, (pearlash,) twelve ounces; nitrate of soda, eight ounces. The solid ingredients are mixed in any suitable vessel or holder in the same manner, as above described, with reference to the making of the fertilized fiber, and the whole is boiled for about one hour in sixty gallons of water. The resulting liquor is removed from the boiler and three pounds of potash (pearlash) and three quarts of brewers' yeast or other ferment and also about two pounds of sugar or saccharine matter are added to each two hundred gallons of the liquid, which is allowed to ferment for about a week. The sugar gives the yeast or other ferment something to feed upon and not only expedites the fermentation, but insures a more thorough fermentation of the liquid.

I do not confine myself to the proportions above mentioned, as such proportions can be varied to some extent without materially altering the character of my improved fertilized fiber or liquid fertilizer.

Instead of using the materials hereinbefore mentioned I may use their chemical or functional equivalents—that is to say, instead of the soot I can employ the following mixture: carbon, thirty-three per cent.; ammonium chlorid, one per cent.; ammonium sulfate, six per cent.; sodium chlorid, twenty-three per cent.; oxid of iron, ten per cent.; oxid of aluminium, five per cent.; calcium sulfate, one per cent.; calcium silicate, two per cent.; calcium carbonate, one per cent.; magnesium silicate, five per cent.; silica, eight per cent.; potash, five per cent.; total, one hundred per cent.

Instead of the gypsum I can use the following mixture: calcium sulfate, sixty-five per cent.; calcium carbonate, ten per cent.; oxid of iron, three per cent.; alumina, two per cent.; silica, fifteen per cent.; water, five per cent.; total, one hundred per cent.

Instead of the bone-meal I can use the following mixture: gelatin, thirty-three per cent.; calcium phosphate, fifty-seven per cent.; calcium carbonate, four per cent.; magnesium phosphate, three per cent.; sodium chlorid, three per cent.; total, one hundred per cent.

These ingredients may be substituted for the soot, gypsum, and bone-meal in making both the fertilized fiber and the liquid fertilizer above described.

An analysis of the liquid produced by mixing the before-mentioned substances after fermentation has shown it to consist of sodium chlorid, potassium sulfate, ammonium sulfate, calcium sulfate, magnesium sulfate, calcium chlorid, calcium nitrate, calcium carbonate, iron and aluminium phosphates, and silica.

What I claim as my invention is—

1. The herein-described process of manufacturing a fertilized material, which process consists in first dissolving in water, phosphoric acid, carbonate of potash (pearlash) and nitrate of soda, adding thereto a mixture of soot, gypsum and bone-meal with water, boiling therein a spongy or fibrous material as peat-moss, and then straining the product, adding yeast and sugar or saccharine matter thereto and fermenting the product.

2. The herein-described process of manufacturing a liquid fertilizing material, which process consists in boiling together soot, gypsum, bone-meal, phosphoric acid, carbonate of potash (pearlash) and nitrate of soda, then adding to the boiled liquor carbonate of potash (pearlash), yeast and sugar or saccharine matter and fermenting it, substantially as hereinbefore described.

3. As an article of manufacture, a fermented fertilized material produced by the process described and consisting of a spongy or fibrous substance, such as peat-moss, sodium chlorid, potassium sulfate, ammonium sulfate, calcium sulfate, magnesium sulfate, calcium chlorid, calcium nitrate, calcium carbonate, iron and aluminium phosphates and silica, substantially as hereinbefore described.

4. A fermented liquid fertilizer produced by the process described and consisting of sodium chlorid, potassium sulfate, ammonium sulfate, calcium sulfate, magnesium sulfate, calcium chlorid, calcium nitrate, calcium carbonate, iron and aluminium phosphates and silica, substantially as hereinbefore described.

In testimony whereof I have hereunto set my hand in presence of two subscribing witnesses.

CHARLES HALFORD THOMPSON.

Witnesses:
S. J. LEDDIEL,
F. R. PEARCE.